United States Patent [19]

Ogawa

[11] Patent Number: 4,460,267

[45] Date of Patent: Jul. 17, 1984

[54] REMOVABLE DEVELOPING DEVICE WITH SHUTTER

[75] Inventor: Hiroshi Ogawa, Yokohama, Japan

[73] Assignee: Canon Kabushiki Kaisha, Tokyo, Japan

[21] Appl. No.: 505,961

[22] Filed: Jun. 20, 1983

[30] Foreign Application Priority Data

Jun. 28, 1982 [JP] Japan ................................ 57-111074

[51] Int. Cl.$^3$ .............................................. G03B 15/00

[52] U.S. Cl. .......................... 355/3 DD; 222/DIG. 1; 118/657

[58] Field of Search ................ 355/3 DD, 3 R, 14 D, 355/133; 222/DIG. 1, 505; 118/653–658

[56] References Cited

U.S. PATENT DOCUMENTS 3,985,436 10/1976 Tanaka et al. .......................... 355/8

4,364,656 12/1982 Yanagawa ....................... 355/3 CH

*Primary Examiner*—J. V. Truhe

*Assistant Examiner*—David Warren

*Attorney, Agent, or Firm*—Fitzpatrick, Cella, Harper & Scinto

[57] ABSTRACT

A developing device mountable into and demountable from an image formation apparatus, includes a housing provided with an aperture, a shutter assuming a position to close the aperture when the device is mounted in the image formation apparatus, and a position to open the aperture when the device is not mounted in the image formation apparatus.

7 Claims, 6 Drawing Figures

REMOVABLE DEVELOPING DEVICE WITH SHUTTER

BACKGROUND OF THE INVENTION

1. Field of the Invention

The present invention relates to a dry type developing device, usable with various types of image formation apparatus, for developing an electrostatic latent image, an electric potential latent image, a magnetic latent image or the like which has been formed on a photosensitive member, an insulating member, a magnetic member or the like by an electrophotographic process, an electrostatic recording process, a magnetic recording process or the like, respectively. And, the present invention provides a developing device free from the disadvantages of the developer scattering and the like, when the image formation apparatus is loaded with the developing device.

2. Description of the Prior Art

Various types of dry developing devices have been used with image forming machines. The dry type developing devices can be divided into two groups, one using one component developer which consists substantially only of toner particles, the other using two component developer which contains carrier particles (iron particles, glass particles or the like) in addition to toner particles. Each of the two groups can be further divided into various categories depending on the principles and systems utilized.

However, it is common, despite the differences in the principles and systems, that the developing devices have, at their constituent elements, a housing for accommodating developer, an aperture formed in the housing, wherein a developer carrying member or sleeve is used to supply, through the aperture, developer to the image bearing member to be developed (in a system such as a sleeve in a so-called jump development, a magnetic brush roller in a so-called magnetic brush development), or wherein the image bearing member is faced to the aperture to supply the developer to the image bearing member to be developed (in a system such as a cascade development, powder cloud development or the like).

Also, any of the types of developing device are made mountable into and demountable from the image formation apparatus to facilitate the necessary maintenance, service and exchanging work (for example, users of the image formation apparatus may interchange a developing device for a certain color with one for another color). To make easier the mounting and demounting operation, various proposals have been made.

It should be noted that, when the developing device is not set in the image formation apparatus, the developer carrier (carrying member or sleeve) is exposed outside through the aperture, or the aperture opens. Therefore, the developer existing on the developer carrying member or within the housing easily scatter around, especially when the device is vibrated, when the operator carelessly touches the developer carrier, or when there is air movement. Since the image formation apparatus is usually installed in offices, the office floor, the working table, operators clothes or the outer surfaces of the developing device tends to stain with the toner particles. Moreover, the surface of the developer carrier is exposed so as to be easily struck directly by something. Additionally, the surface, which is in some cases magnetized, can attract to itself small parts, such as a metal segments or small screws. If those parts attached are overlooked, and the developing device is set into the image formation apparatus with those parts, they will damage the surface of the image carrier when the operation thereof starts.

SUMMARY OF THE INVENTION

The object of the present invention is to provide a developing device which is free from such disadvantages as stated above.

Another object of the present invention is to provide a developing device having an aperture which opens when mounted in place in the image formation apparatus and closes when demounted therefrom.

The developing device of the present invention achieving those objects includes a housing for accommodating the developer, an aperture formed at a side of the device adapted to be faced to the image bearing member of the image formation apparatus, a shutter member for closing and opening the aperture, the shutter member being at a position to open the aperture when the developing device is mounted in place in the image formation apparatus, and being at a position to close the aperture when the developing device is not mounted in the image formation apparatus.

The above and other objects, features and advantages of the present invention will become more apparent from the following description of the preferred embodiments thereof taken in conjunction with the accompanying drawings.

DETAILED DESCRIPTION OF THE PREFERRED EMBODIMENTS

Figure 4:
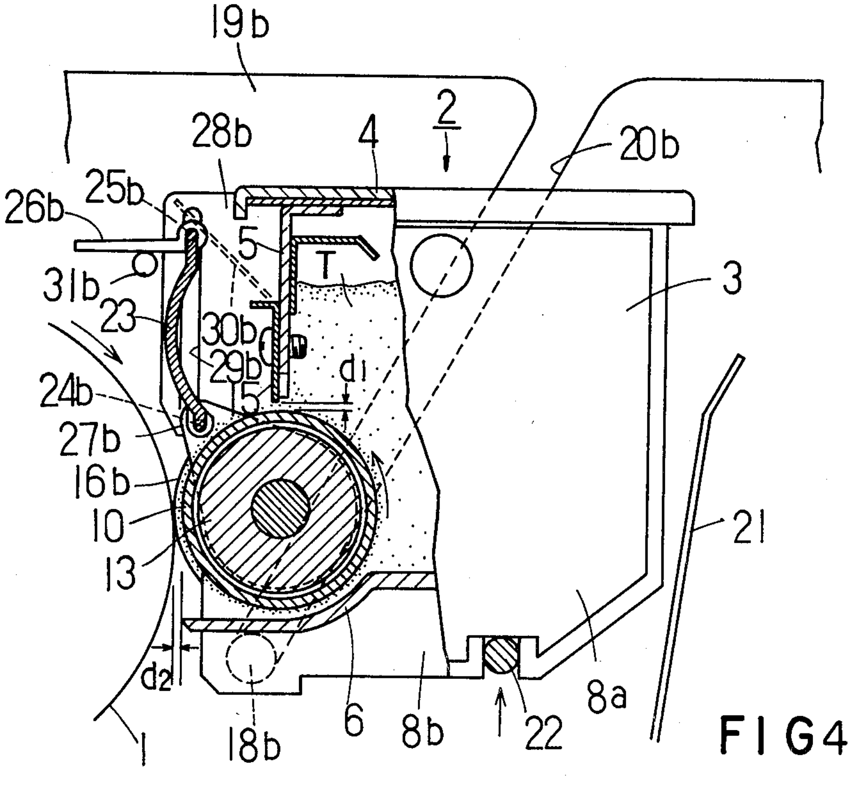
FIG. 4 shows a partly cross-sectional side view of the developing device according to the present invention, wherein the developing device is mounted in the image formation apparatus so that the aperture is opened.
Figure 5:
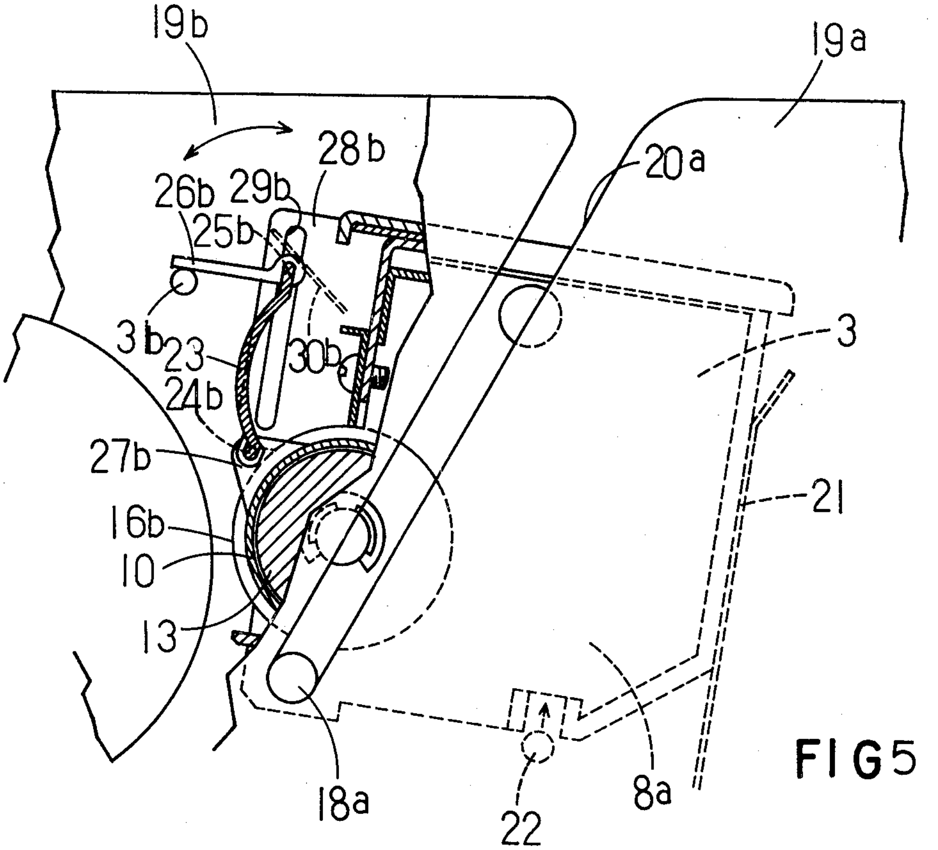
FIG. 5 shows a partly cross-sectional view of the developing device, wherein the developing device is rotated about its supporting shaft slightly away from the image bearing member.

Referring FIGS. 4 and 5, a rotatable drum is designated by reference numeral 1, which functions as an image bearing member, i.e., a photosensitive member in an electrophotographic apparatus, an insulating member in an electrostatic recording apparatus, or a magnetic member in a magnetic recording apparatus. The rotatable drum 1, which will hereinafter also be called the "drum", rotates, in use, in the sense shown by the arrow. Around the drum 1, there are provided known latent image formation process means, which are omitted for the sake of simplicity.

Figure 1:
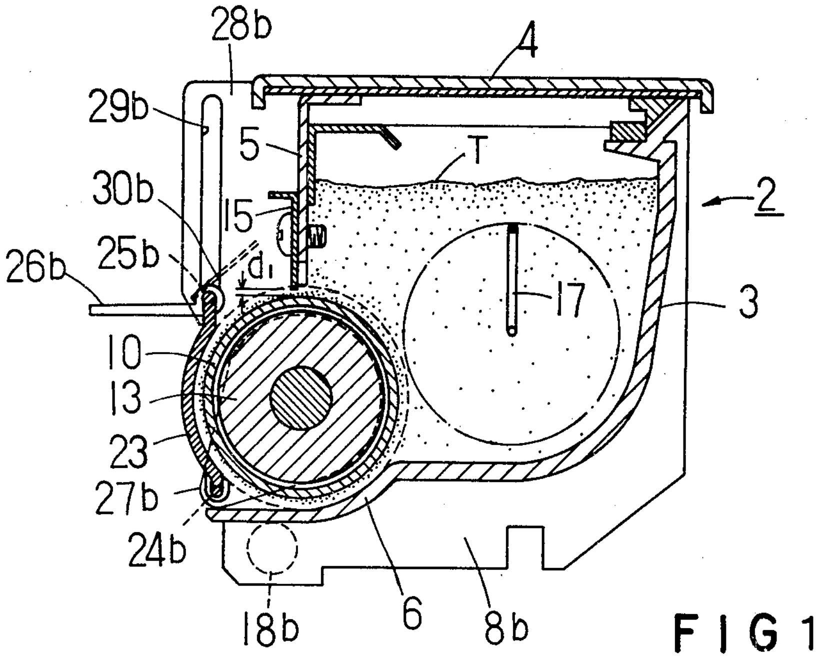
FIG. 1 shows a cross-section of a developing device according to the present invention, wherein the developing device has been taken out of the image formation apparatus so that the aperture is closed.
Figure 3:
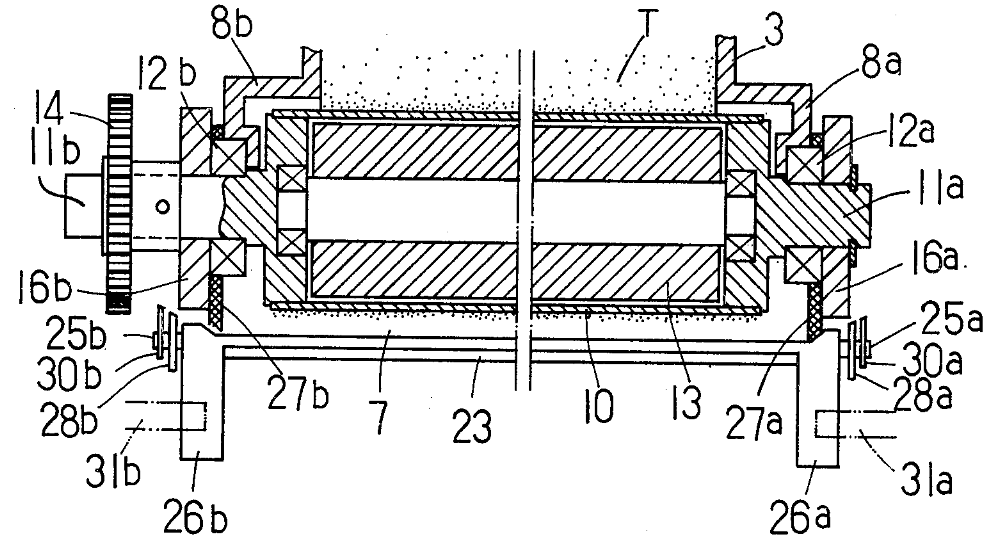
FIG. 3 shows a longitudinal cross-section of the sleeve of the developing device.

Referring to FIG. 1, reference numeral 2 generally depicts the developing device, which is in this embodiment, of non-contact type and is used with a one-component magnetic developer (hereinafter called "toner"). The developing device 1 has a housing 3 for accommodating the toner therein, which extends along and is substantially as long as the drum 1 in the direction perpendicular to the sheet of the drawing of FIG. 1. The housing 3 is provided with a top cover 4 which is openable to allow the supply of toner T into the housing 3. A wall plate 5 of the housing 3 extends to form a side wall, but it does not reach to the bottom plate 6 of the housing 3 to form an aperture 7 (FIG. 3). The housing 3 further includes a developer carrying member, i.e., sleeve 10 of which the righthand part (substantially half) is accommodated in the housing 3, and the rest, the lefthand part, is exposed outside of the housing 3 through the aperture 7.

Referring to FIG. 3, the shafts 11*a* and 11*b* of the sleeve 10 are rotatably supported in the bearings 12*a* and 12*b* which are mounted on the front wall plate 8*a* and the rear wall plate 8*b*, respectively, of the housing 3. The sleeve 10 has a length substantially equal to the length of the aperture 7 and is made of a non-magnetic material such as stainless steel. Within the sleeve 10 is a multi-pole magnet roller 13 which is stationary, although the sleeve 10 is rotatable.

The sleeve 10 is rotated through the driving gear 14 which is fixed on the rear shaft 11*b* and meshes with an unshown drive gear of the image formation apparatus when it is mounted therein. (FIG. 4). By the driving mechanism, the sleeve 10 rotates counterclockwise in FIG. 4 as shown therein by the arrow, and at the same peripheral speed as the drum 1. The magnet roller 13 within the sleeve 10 is kept from rotation, that is, it is fixed.

In FIG. 4, a blade 15 of magnetic or non-magnetic material is fixed, above the sleeve 10, on the lefthand side wall plate 5 by screw or the like with a small clearance d1 between its lower edge and the sleeve 10 surface. The blade 15 functions as the developer layer thickness limiting member and extends along and is as long as the sleeve 10.

As shown in FIG. 3, the front and rear shafts 11*a* and 11*b* have respective spacer rolls 16*a* and 16*b* secured thereto, which are adapted to engage the surface of the drum 1 adjacent their opposite ends when the developing device 2 is mounted in the image formation apparatus. Since the outer diameter of the spacer rolls 16*a* and 16*b* is slightly larger than that of the sleeve 10, there is provided a clearance d2 between the surface of drum 1 and the surface of sleeve 10, when the image formation apparatus is loaded with the developing device 2.

Referring back to FIG. 1, within the housing 3 is a stirring member 17 for stirring the toner particles contained in the housing 3. The stirring member 17 is rotated by an unshown driving mechanism when the developing device 2 is mounted in place in the image formation apparatus and operated for development action. The rotation of the stirring member 17 may be continuous or intermittent. The housing 3 is provided with a shutter member 23, which will be described in detail hereinafter.

As for the methods for mounting the developing device 2 into the image formation apparatus and demounting it from the image formation apparatus, there are two types, in one of which a front door of the image formation apparatus is opened, and the developing device is moved along the axis of the drum 1, in the other of which the upper structure of the image formation apparatus is removed to open the upper part of the image formation apparatus, and the developing device 2 is moved up or down. FIGS. 1–5 show the latter type. As shown in FIGS. 4 and 5, the housing 3 is provided with supporting shafts 18*a* and 18*b* which project out of the front and rear wall plates 8*a* and 8*b*, respectively, of the housing 3. The shafts 18*a* and 18*b* are adapted to be engaged in the slots 20*a* and 20*b* of the plates 19*a* and 19*b* of the image formation apparatus, which slots are inclined as shown in FIGS. 4 and 5.

When the developing device 2 is to be mounted into the image formation apparatus, the developing device 2 is placed above the image formation apparatus so that the shafts 18*a* and 18*b* are engaged into the slots 20*a* and 20*b* respectively, and then the developing device 2 is lowered along the slots 20*a* and 20*b*. During the lowering action, the righthand edges of the front wall plate 8*a* and rear plate 8*b* are guided along a guide plate 21 as shown in FIG. 5. That is, the developing device 2 is slightly inclined so that the righthand edges of the wall plates 8*a* and 8*b* slide on the guide plate 21. The developing device 2 is lowered, or let fall gradually until the shafts 18*a* and 18*b* abut the ends of slots 21*a* and 21*b*, respectively. FIG. 5 shows the state whereat the shafts 18*a* and 18*b* abut the bottom ends of the slots 20*a* and 20*b*. The developing device is still slightly inclined rightwardly to be away from the drum 1, the developing device 2 is maintained in such a state at this moment.

The image formation apparatus has a member 22 for displacing the developing device 2 by an unshown mechanism. The member 22 pivots the developing device 2 about the shafts 18*a* and 18*b* in the counterclockwise direction, so that the developing device 2 is set in place so that the spacer rolls 16*a* and 16*b* about the surface of the drum 1 adjacent its opposite ends. Then, the developing device 2 is locked at this position by an unshown mechanism for actuating the member 22. As described hereinbefore, the contact between the spacer rolls 16*a* and 16*b* and the drum 1 surface maintains a predetermined clearance between the drum 1 surface and the sleeve 10 surface. The member 22 resiliently urges the developing device 2 in the direction of contacting the spacer rolls 16*a* and 16*b* to the drum 1 surface.

When the developing device 2 is mounted in the image formation apparatus, as shown in FIG. 4, the righthand half of the sleeve 10 surface is within the housing 3 to be always contacted with the toner T contained in the housing 3. The toner T in the neighborhood of the sleeve 10 surface is caught by the magnetic field produced by the magnet roller 13 within the sleeve 10 and attracted on the sleeve 10 surface, thus forming an attracted toner layer thereon. When the sleeve 10 is rotated for developing operation in the direction shown by the arrow substantially at the same peripheral speed as the drum 1, the attracted toner, carried on the sleeve 10 surface, is conveyed with the sleeve 10 and regulated to a uniform thin layer T1 by passing through the clearance formed by the blade 15 and the sleeve 10 surface. The regulated toner layer T1 is then brought facing to the drum 1 surface by the rotation of the sleeve 10, where the toner of the regulated toner layer selectively transfer to the drum 1 surface correspondingly to the latent image pattern, thus developing the latent image. The sleeve 10 surface from which the toner has been selectively consumed returns into the housing 3 by the rotation thereof and is contacted again with the toner T contained therewithin. Thus, the sleeve 10 surface having a regulated toner layer T1 is continuously brought to face the drum 1 surface so that continuous development is carried out.

The mechanism of the shutter member 23 will now be described. The shutter member 23 is of an elongate shape having a dimension (length and width) enough to cover the exposed half of the sleeve 10 and having an arcuate cross-section to conform with the sleeve 10 surface. The shutter member 23 is provided with pins 24*a*, 24*b*, 25*a* and 25*b* respectively at the upper and lower portions thereof adjacent its longitudinal opposite ends. Also, at the upper portion of the shutter member 23 adjacent its longitudinal opposite ends, there are projections 26*a* and 26*b* integral therewith and extending away from the sleeve 10.

Levers 27*a* and 27*b* are supported for rotation on the outer surface of the bearings 12*a* and 12*b* for the shafts 11*a* and 11*b*, and they have adjacent to their ends respective holes, into which the pins 24*a* and 24*b* are rotatably supported to link the lower part of the shutter member 23 and the levers 27*a* and 27*b*.

The housing 3 is provided with a couple of plates 28*a* and 28*b* secured by screws or the like to the lefthand parts of the front and rear wall plates 8*a* and 8*b* and extending toward the drum 1. The plates 28*a* and 28*b* have respective vertical slots 29*a* and 29*b* into which the upper pins 25*a* and 25*b* are inserted to link the upper part of the shutter member 23 with the plates 28*a* and 28*b*. The pins 25*a* and 25*b* are downwardly urged by springs 30*a* and 30*b* having respective one ends urging on the pins 25*a* and 25*b* at their upper portion and the other ends fixed on the plates 28*a* and 28*b*.

Figure 2:
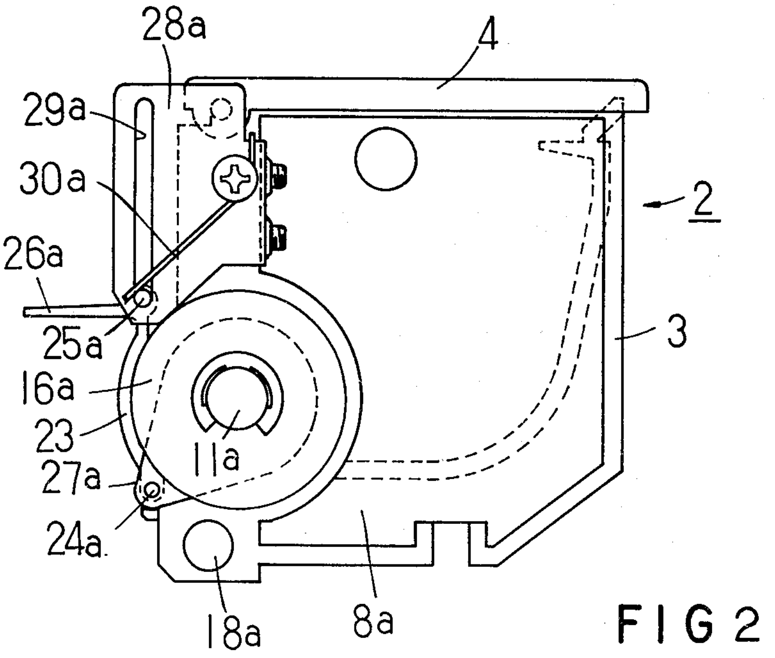
FIG. 2 shows a front view of the developing device of FIG. 1.

Therefore, when the developing device 2 is not mounted in the image formation apparatus, the shutter member 23 closes the aperture, where the pins 25*a* and 25*b* are at a position abutting the bottom of the slots 29*a* and 29*b* by the force applied by the springs 30*a* and 30*b* and by the dead weight of the shutter member 23 and others, and where the levers 27*a* and 27*b* assume the lower positions to make the shutter member 23 cover the exposed half of the sleeve 10, as shown in FIGS. 2 and 1. Thus the exposed part of the sleeve 10 surface is substantially covered and shielded.

When the developing device 2 is mounted into the image formation apparatus in the manner described hereinbefore, the projections 26*a* and 26*b* of the shutter member 23 abut, at a certain point of time during the developing device 2 being lowered between the front plate 19*a* and rear plate 19*b*, pins 31*a* and 31*b* which are fixed in the image formation apparatus, and which function as shutter actuating members. Since the pins 31*a* and 31*b* are fixed, the shutter member 23 is kept at this position despite the further lowering of the developing device 2. The developing device 2 as a whole, however, continues lowering until the pins 18*a* and 18*b* are received by the bottom ends of the guiding slots 20*a* and 20*b*, so that the relative movement between the housing 3 and the shutter member 23 moves the shutter member 23 upwardly relative to the housing 3 with the upper pins guided in the slots 29*a* and 29*b* against the spring force by the springs 30*a* and 30*b*. Simultaneously, the levers 27*a* and 27*b* are rotated by the shutter member 23 so that the shutter member 23 is raised relative to the housing 3 without contacting the sleeve 10 surface. When the housing is lowered to such an extent that the shafts 18*a* and 18*b* are received by the bottoms of the guiding slots 20*a* and 20*b*, the shutter member 23 is substantially above the sleeve 10 surface. Then, the developing device is pivoted counterclockwise about the shafts 18*a* and 18*b* by the member 22 until the set position is taken as shown in FIG. 4. With this pivoting action, the developing device is further raised slightly so that the sleeve 10 surface is completely exposed through the aperture, and the sleeve 10 is spaced by the predetermined clearance d2 by the spacer rolls 16*a* and 16*b*. The developing device 2 is now ready for operation.

When the developing device 2 is to be demounted from the image formation apparatus, the locking mechanism is firstly operated to release the developing device 2, and then, it is inclined back to the position shown in FIG. 5 about the shafts 18*a* and 18*b*, whereafter it is lifted. During this lifting action, the pins 26*a* and 26*b* are kept contacted on the members 31*a* and 31*b* by the springs 30*a* and 30*b* and the weight of the shutter member 23, until the shutter member 23 closes the aperture. When the developing device is completely taken out of the image formation apparatus, the shutter member 23 substantially cover and shield the sleeve 10 surface exposed through the aperture. The shutter member 23 is kept at the closing position by the springs 30*a* and 30*b*.

Figure 6:
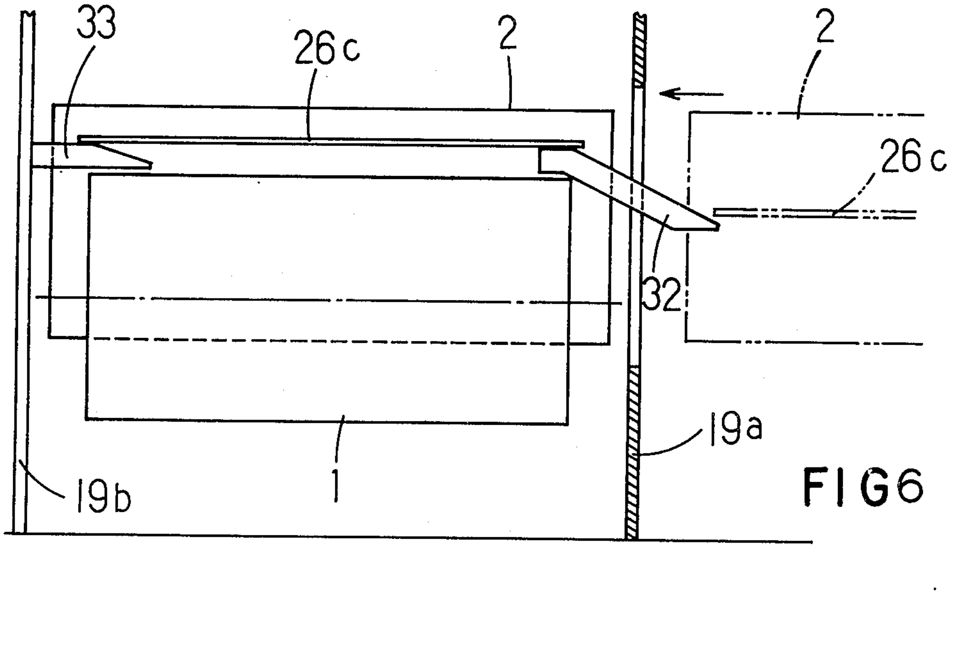
FIG. 6 shows a side view of another embodiment of the developing device according to the present invention.

FIG. 6*a* shows another embodiment of the present invention wherein the developing device 2 is mounted into and demounted from the image formation apparatus through an aperture formed in a front wall 19*a* of the image formation apparatus. In this case, the developing device 2 is moved along the axis of the drum 1. The developing device 2 has the same structure as that of the device shown in FIGS. 1–5, including the shutter member 23. However, it is desirable that the projections 26*a* and 26*b* are replaced by an elongate projection 26*c* extending above and along the shutter member 23.

When the developing device 2 is inserted through the opening provided in the front plate 19*a* of the image formation apparatus, the projection 26*c* abuts the inclined surface of a guide fixed on the image formation apparatus, and is raised by the inclined surface, resulting in the shutter member 23 is also raised. After the projection 26*c* is raised to a predetermined position, it is no longer, raised, even if the developing device 2 is further inserted. The rear plate 19*b* has a guide 33 fixed thereto. The projection 26*c* of the shutter member 23 is finally secured by the guides 32 and 33. Then, the developing device 2 is pivoted about the shafts 18*a* and 18*b* toward the drum 1 in the same manner as with FIGS. 1–5 embodiment, until the spacer rolls 16*a* and 16*b* abut the drum 1 surface. Thus, the object of the present invention can be achieved also when the developing device 2 is moved in parallel with the axis of the drum to mount or demount it.

As described above, according to the present invention, the shutter 23 opens the aperture to expose the sleeve 10 surface to the drum 1 when the developing device 2 is mounted in the image formation apparatus to allow the developing operation; and when it has been demounted from the image formation apparatus, the shutter 23 close the aperture to shield the sleeve 10 surface, so that the possibility of the toner scattering or the foreign matters attaching the sleeve 10 surface when the developing device 2 is taken out of the image formation apparatus, can be minimized. The shutter 23 is kept mounted on the developing device 2, so that there is no possibilities of operator's error of failing to mount the shutter 23 to the developing device 2.

It will be readily understood that the shutter described above can be used with the type of the developing device wherein the aperture is faced to the drum of the image formation apparatus to effect development, so that the advantages of the present invention can be enjoyed with such types of the developing device.

What is claimed is:

1. A developing device, mountable into an image formation apparatus containing an image bearing member, for developing a latent image on the image bearing member when mounted therein, comprising:

a housing for accommodating developer;

means defining an aperture at a side of said housing adapted to face the image bearing member of the image formation apparatus;

developer carrying means provided within said housing at a position adjacent to the aperture; and a shutter member for closing and opening the aperture, said shutter member being at a position to open the aperture when said developing device is mounted in place in the image formation apparatus, and being at a position to close the aperture when said developing device is demounted from the image formation apparatus.

2. A device according to claim 1, wherein said developer carrying means includes a rotatable sleeve and a fixed magnet provided in said sleeve.

3. A device according to claim 1, wherein said housing has a supporting shaft engageable with a guide provided in the image formation apparatus, said device is mounted into the image formation apparatus by lowering along the guide and demounted from the image formation apparatus by lifting it along the guide.

4. A device according to claim 1, wherein said device is mounted into the image formation apparatus by inserting it into the image formation apparatus substantially horizontally and demounted from the image formation apparatus by pulling it out of the image formation apparatus substantially horizontally.

5. A device according to claim 1, wherein said shutter member has a projection engageable with a member provided in the image formation apparatus to move said shutter member.

6. A device according to claim 1, wherein said shutter member has pins adjacent its opposite ends at its upper portion, said pins being engageable into a guide slot provided in said housing and being urged downwardly by a spring.

7. A device according to claim 1, further comprising a spring for resiliently urging said shutter member toward its closing position to automatically restore said shutter member to its closing position.

* * * * *